US008070602B2

(12) United States Patent
Wessling

(10) Patent No.: US 8,070,602 B2
(45) Date of Patent: Dec. 6, 2011

(54) GAMBLING MACHINE

(76) Inventor: Herbert Wessling, Herne (DE)

( * ) Notice: Subject to any disclaimer, the term of this patent is extended or adjusted under 35 U.S.C. 154(b) by 766 days.

(21) Appl. No.: 11/795,776

(22) PCT Filed: Jan. 23, 2006

(86) PCT No.: PCT/EP2006/000553
§ 371 (c)(1),
(2), (4) Date: Aug. 8, 2007

(87) PCT Pub. No.: WO2006/077150
PCT Pub. Date: Jul. 27, 2006

(65) Prior Publication Data

US 2008/0300036 A1 Dec. 4, 2008

(30) Foreign Application Priority Data

Jan. 22, 2005 (DE) ..................... 20 2005 001 032 U

(51) Int. Cl.
*G06F 17/00* (2006.01)

(52) U.S. Cl. ................ 463/37; 463/30; 463/36; 463/42; 273/139; 345/173; 345/174

(58) Field of Classification Search .............. 463/16–21, 463/30, 36–37, 42, 46; 273/85, 138, 138.1, 273/138.2, 138 A, 139, 143 R, 148, 237, 273/269; 200/5 D, 5 E, 43.18, 50.36, 295–296, 200/276.1, 314, 341, 345, 412, 417, 422, 200/510, 520, 530; 345/156, 173–174, 178–180; 73/1.19, 1.23, 1.56; 40/315, 464; 74/473.3, 74/483 PB See application file for complete search history.

(56) References Cited

U.S. PATENT DOCUMENTS 5,283,559 A * 2/1994 Kalendra et al. .............. 345/168
5,488,204 A * 1/1996 Mead et al. ................ 178/18.06
5,543,588 A * 8/1996 Bisset et al. ............... 178/18.06

(Continued)

FOREIGN PATENT DOCUMENTS

EP 0 782 092 A 7/1997

(Continued)

OTHER PUBLICATIONS

International Search Report.

*Primary Examiner* — Arthur O. Hall
(74) *Attorney, Agent, or Firm* — Collard & Roe, P.C.

(57) ABSTRACT

The present invention relates to a gambling machine comprised of a display unit (1) to display a course of a game and to display game results, and comprised of an operating unit (3) to influence the course of a game, and comprised of an electronic control unit (2) connected to the display unit (1) and to the operating unit (3) to control the course of a game and to determine the game results. To provide such a gambling machine wherein the operating unit (3) is wear-free and vandalism-safe, the present invention proposes that the operating unit (3) be comprised of an operating panel (4) made of a dielectrical shockproof material, the front side of which forms the operating panel of the operating unit (3), with the operating panel (4) being comprised of an operating field (5) or being subdivided into several operating fields (5), and wherein a capacitive sensor element (8) arranged on the rear side of the operating panel (4) is allocated to each operating field (5).

4 Claims, 1 Drawing Sheet

U.S. PATENT DOCUMENTS

| | | | | | |
|---|---|---|---|---|---|
| 5,844,506 | A | * | 12/1998 | Binstead | 341/34 |
| 5,861,583 | A | * | 1/1999 | Schediwy et al. | 178/18.06 |
| 6,002,389 | A | * | 12/1999 | Kasser | 345/173 |
| 6,138,523 | A | * | 10/2000 | Callicott et al. | 73/865.7 |
| 6,204,839 | B1 | * | 3/2001 | Mato, Jr. | 345/168 |
| 6,288,707 | B1 | * | 9/2001 | Philipp | 345/168 |
| 6,323,846 | B1 | * | 11/2001 | Westerman et al. | 345/173 |
| 6,392,637 | B2 | * | 5/2002 | Liao et al. | 345/173 |
| 6,429,846 | B2 | * | 8/2002 | Rosenberg et al. | 345/156 |
| 7,030,860 | B1 | * | 4/2006 | Hsu et al. | 345/173 |
| 7,109,978 | B2 | * | 9/2006 | Gillespie et al. | 345/173 |
| 7,161,589 | B2 | * | 1/2007 | Muir | 345/173 |
| 7,345,680 | B2 | * | 3/2008 | David | 345/174 |
| 7,628,701 | B2 | * | 12/2009 | Wells | 463/37 |
| 7,663,607 | B2 | * | 2/2010 | Hotelling et al. | 345/173 |
| 7,782,307 | B2 | * | 8/2010 | Westerman et al. | 345/173 |
| 7,798,902 | B2 | * | 9/2010 | Rasmussen | 463/30 |
| 2001/0013855 | A1 | * | 8/2001 | Fricker et al. | 345/156 |
| 2001/0015718 | A1 | * | 8/2001 | Hinckley et al. | 345/156 |
| 2002/0173354 | A1 | | 11/2002 | Winans et al. | |
| 2003/0067451 | A1 | * | 4/2003 | Tagg et al. | 345/174 |
| 2004/0266518 | A1 | | 12/2004 | Gauselmann | |
| 2005/0041018 | A1 | * | 2/2005 | Philipp | 345/178 |
| 2006/0278444 | A1 | * | 12/2006 | Binstead | 178/18.06 |

FOREIGN PATENT DOCUMENTS

| | | | | |
|---|---|---|---|---|
| JP | 2001350588 | A | * | 12/2001 |
| JP | 2002035202 | A | * | 2/2002 |
| JP | 2002278689 | A | * | 9/2002 |
| KR | 20080058862 | A | * | 6/2008 |

* cited by examiner

GAMBLING MACHINE

CROSS REFERENCE TO RELATED APPLICATIONS

Applicant claims priority under 35 U.S.C. §119 of German Application No. 20 2005 001 032.4 filed Jan. 22, 2005. Applicant also claims priority under 35 U.S.C. §365 of PCT/EP2006/000553 filed Jan. 23, 2006. The international application under PCT article 21(2) was not published in English.

The present invention relates to a gambling machine comprised of a display unit to display the course of a game and to display game results, and comprised of an operating unit to influence the course of a game, and comprised of an electronic control unit connected to the display unit and to the operating unit to control the course of a game and to determine the game results.

In most cases, gambling machines of this kind are commercially operated in so-called game halls. There are gambling machines known which serve to perform entertainment games, such as for example flipper automats. Furthermore operated in game halls are gambling automats by which minor or major amounts of money can be won according to the accidental principle. For example, gambling automats by which card games such as Poker or Black Jack are simulated enjoy particular popularity. Accordingly, the course of a game as well as the cards existing in the game are displayed to a player by means of the display unit of the gambling machine. By means of the operating unit of the gambling machine, a player influences its game by playing certain game cards and making certain stakes of money. The course of a game, i.e. the distribution of cards, the administration of stakes subject to the player's operation, and the determination of the game results, proceeds by means of the electronic control unit of the gambling machine which is connected to the display unit and to the operating unit. Gambling automats like those operated in game halls are moreover comprised of money injector and money ejector devices which are also linked to the electronic control unit.

The operating units of prior art gambling machines are usually equipped with electromechanical switches or touch keys. As a rule, these are comprised of a pushbutton key made of plastic material which is comparably large in area and possibly provided with an interior illumination. In most cases, this pushbutton key is movably guided in a pedestal, with said pedestal being inserted into an appropriate installation port of the operating unit. Keys or switches which are implemented in commercial gambling machines are generally of a very robust construction. But nevertheless, there is a problem in that mechanically movable component parts of the operating unit of conventional gambling machines wear-out rapidly. Switches and/or keys are regularly destroyed, be it by vandalism or by exaggerated zeal while playing. Wear and/or destruction of operating units calls for expensive and extensive maintenance work. The high cost involved for maintenance and spare parts are to be borne by game hall operators.

Now, therefore, and against this background, it is the object of the present invention to provide a gambling machine with a wear-free and vandalism-safe operating unit. Operating comfort and game fun as compared with conventional gambling machines should thereby not be adversely affected.

The present invention achieves this object proceeding from a gambling machine of the initially mentioned kind by providing an operating unit comprised of an operating panel made of a dielectrical, shockproof material, the front side of which forms the operating surface of the operating unit, with said operating panel being comprised of an operating field or being subdivided into several operating fields, and with a capacitive sensor element mounted on the rear side of said operating panel being allocated to each operating field.

The essential benefit of the inventive gambling machine lies in that its operating unit needs no mechanically movable parts at all. The front side of the operating panel is formed by the operating surface of the operating unit of the inventive gambling machine which an operator of the gambling machine touches while playing. By touching the operating panel in the area of the corresponding operating fields, the capacitive sensors allocated to each of the operating fields respond and trigger corresponding control signals which are transmitted to the electronic control unit of the gambling machine so that it can control the course of the game accordingly. According to the present invention, the capacitive sensor elements are arranged on the rear side of the operating panel. The capacitive sensor elements respond to the approach of a finger and/or hand of the operator. An essential factor to ensure proper functioning of the operating unit of the inventive gambling machine is that an approach can be reliably detected based upon a variation in capacitance through the operating panel consisting of an electrically isolating material. The operating panel is made of a shockproof material so that even if subjected to extreme force impacts a damage to the operating unit need not be feared of. The operating unit of the inventive gambling machine thereby is highly wear-free and vandalism-safe. Cost of maintenance and repair as compared with conventional gambling machines operating with electromechanical keys are significantly reduced.

In accordance with a purposive improvement of the inventive gambling machine, the operating panel is at least partly transparent, with a marking foil being arranged between the operating panel and the sensor surfaces of the sensor elements, said marking foil being imprinted in conformity with the subdivision of the operating panel into operating fields. On account of this setup, the operating unit can be adapted very easily for the operation of gambling machines of a different kind by means of a corresponding imprinting of the marking foil and also by way of a corresponding arrangement of the sensor surfaces of the sensor elements. Hence, even gambling machines which are equipped with conventional electromechanical keys can unproblematically be retrofitted with an operating unit according to the present invention. If required, it is thereby also possible to replace individual keys with an operating unit according to the present invention.

The sensor surfaces of the sensor elements with the inventive gambling machine are expediently connected via a digital evaluation electronics to the electronic control unit. The digital evaluation electronics can be available as an integrated switching circuit which constitutes the interface between the operating unit and the control unit of the gambling machine. The evaluation electronics evaluates the capacitance values picked-up at the sensor surfaces of the sensor elements and thereof it generates the appropriate control signals. The evaluation electronics can advantageously be of a multiple channel configuration so that a plurality of sensor elements can be evaluated by means of a single integrated switching circuit and so that the operating unit of the inventive gambling machine as a whole can do only with one integrated module for the evaluation electronics.

Furthermore it is advantageous to arrange the digital evaluation electronics with the inventive gambling machine spatially away from the operating panel. The possibly sensitive evaluation electronics is thus protected from shaking or shocks that might occur at the operating panel when operating the gambling machine, more particularly if the operating unit is subject to heavy force impacts. If the digital evaluation electronics is arranged spatially away from the operating panel, it is to be observed that the evaluation of the capacitive sensor elements must be so performed that parasitic capacities in the area of the electrical connecting lines between the evaluation electronics and the sensor surfaces do not cause any interference. This can be achieved by configuring the evaluation electronics so as to record dynamic variations in capacitance.

A particular expedient configuration of the inventive gambling machine is obtained by configuring the digital evaluation electronics in such a way that it evaluates for each sensor element the variation in time of the capacitance recorded at the relevant sensor surface and, depending on the result of this evaluation, generates a control signal that is transmitted to the electronic control unit. Accordingly, the digital evaluation electronics merely responds to variations in capacitance rather than to variations in its absolute value. The absolute value of the capacitance would represent an unreliable criterion to trigger switching functions, because it is strongly dependent upon hardly controllable environmental influences. In particular, the digital evaluation electronics can be configured for evaluation of the velocity of the variation in capacitance at the sensor surface. If the velocity of capacitance variation exceeds a defined limit value, then a control signal for the control unit of the gambling machine is generated on condition that the velocity of capacitance variation does not again fall under this limit value during a defined time interval. With a slow approach to the sensor surface with the finger or hand of the operator of the gambling machine, the control signal is generated only very late, due to the accordingly slow velocity of capacitance variation, i.e. when the finger and/or the hand touches the operating panel of the operating unit. If the approach is too slow, no control signal at all is generated, which is advantageous, for example to avoid that a mere accidental approach to the operating unit leads to an unintentional operation of the gambling machine. By evaluating the variation in time of the recorded capacitance by the digital evaluation electronics, motion sequences (approach, inertia, disappearing) of the finger and/or hand can advantageously be set in a time relation to each other and be evaluated. Hereby, a novel way in the operation of gambling machines can be realized by which the game fun as compared with conventional gambling machines can be increased.

As the operating unit of the inventive gambling machine can do without mechanically movable component parts, playing lacks the operating noise and sound which is usual with conventional gambling machines and which usually occur on operating the electromechanical keys. Therefore it is expedient to provide for the inventive gambling machine a sound producing switching circuit allocated to the operating unit and designed for electronic generation of operating noise and sound. Hereby it is achieved that the operator of the gambling machine does not have to dispense with the acoustic game adventure which a player is accustomed to, despite the novel operating unit.

An example of an inventive embodiment is explained in the following by way of the attached drawings, wherein.

Figure 1:
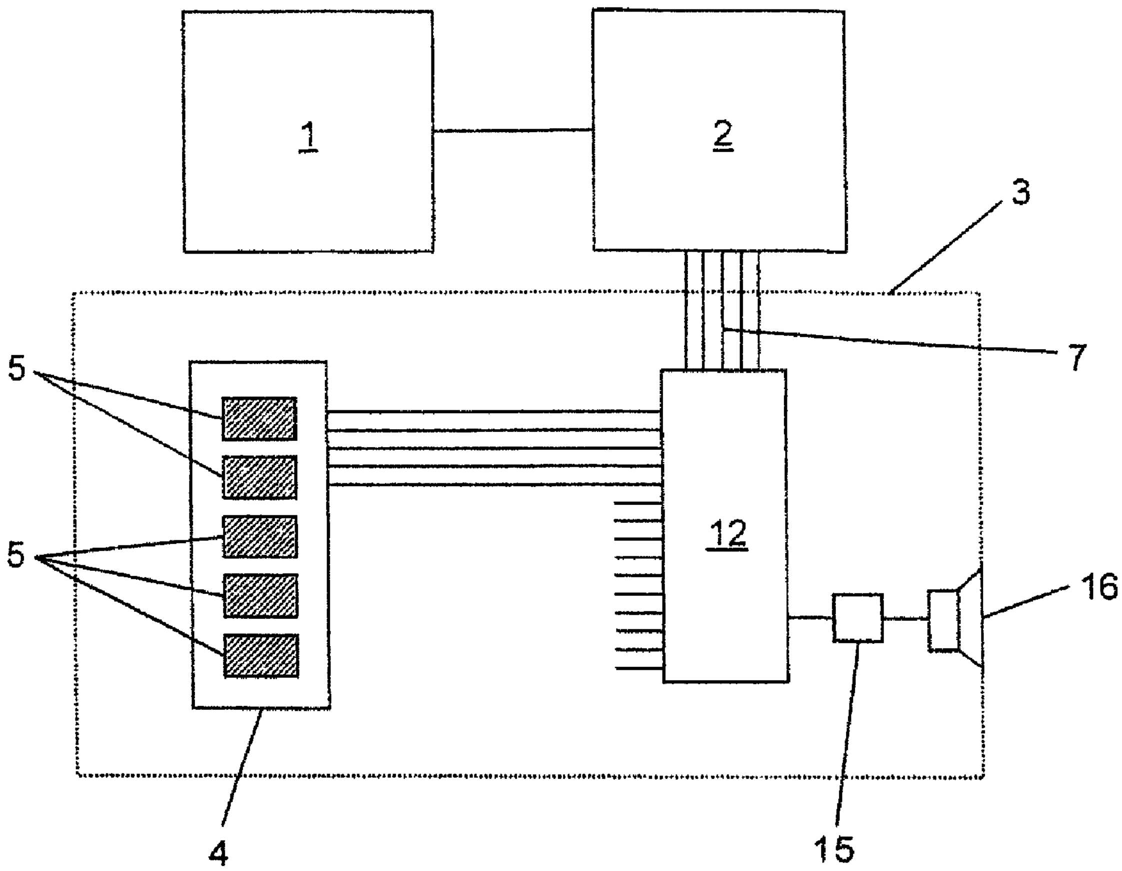
FIG. 1 shows the inventive gambling machine in form of a block diagram.
Figure 2:
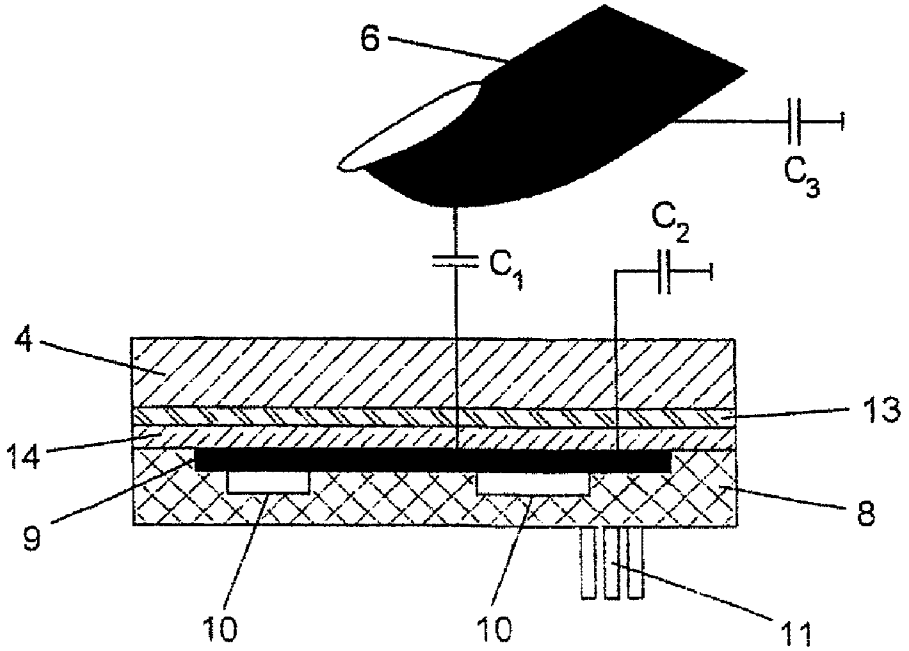
FIG. 2 shows a sectional side view of the operating unit of the inventive gambling machine.

The gambling machine is comprised of a display unit 1, which may be a usual picture tube, a flat screen or an LED matrix display. The display unit 1 is connected to an electronic control unit (2) of the gambling machine. The electronic control unit (2) is controlled by a micro-processor and it is mainly set-up like a usual micro-computer. By way of an appropriate programming, the electronic control unit (2) is capable of controlling the course of a game and to determine the game results. Furthermore, the gambling machine is linked to an operating unit (3) that enables the user of a gambling machine to take influence on the course of the game. In accordance with the present invention, the operating unit (3) is comprised of an operating panel (4), which is subdivided into a plurality of operating fields (5). By touching the operating fields (5) with a finger (6) of the person operating the gambling machine, control signals are generated which are transmitted via cable connectors (7) to the electronic control unit (2) of the gambling machine. The operating panel (4) is comprised of the electrically isolating, i.e. dielectrical and shockproof material. The use of a several millimeters thick massive panel made of polystrol (PS) turned out to be very expedient. Polystrol is a particularly hard and form-stable plastic material, as is well known. The front side of the operating panel (4) forms the operating surface of the operating unit (3), which is touched by the finger (6) of the user of the gambling machine when operating it. Allocated to each operating field (5) of the operating unit (3) is a capacitive sensor element (8) arranged on the rear side of the operating panel (4). This sensor element is comprised of a sensor surface (9) which on its rear side is provided with SMD modules (10). The sensor surface (9) together with the SMD modules (10) is embedded into a plastic cast body. Contact pins (11) are provided for connecting the sensor elements (8) with a digital evaluation electronics (12) of the operating unit (3). As one can see on FIG. 2, a marking foil (13) is arranged between the operating panel (4) and the sensor surface (9) of the sensor element (8). Said marking foil is imprinted in accordance with the subdivision of the operating panel (4) into operating fields (5). Through the transparent operating panel (4), the subdivision of the operating panel (4) into operating fields (5) is accordingly recognizable to the operator of a gambling machine. By means of an adhesive foil (14) the sensor element (8) is connected to the marking foil (13). On the whole, it thereby results the sandwich-like setup pursuant to FIG. 2. The digital evaluation electronics (12) constitutes the interface of the operating unit (3) between the sensor elements (8) and the electronic control unit (2) of the gambling machine. The digital evaluation electronics (12) is of such a configuration that it evaluates for each sensor element (8) the variation in time of the capacitance recorded at the sensor surfaces (9) and generates a control signal, depending on the result of the evaluation, which is transmitted to the electronic control unit (2) via the cable connectors (7). FIG. 2 elucidates that the value of the capacitance picked-up at the sensor surface (9) is determined by the network of the three capacities $C_1$, $C_2$ and $C_3$. $C_1$ is the capacitance between the sensor surface (9) and the finger (6). $C_2$ reflects the capacitance between the sensor surface (9) and the remaining environment of the gambling machine. $C_3$ is the capacitance value of the body of the operator of the gambling machine. When the finger (6) approaches the sensor surface (9), it is above all the value $C_1$ which changes and varies. The overall variation of the capacitance value of the network comprised of $C_1$, $C_2$ and $C_3$ is recorded at the sensor surface (9) through the dielectric operating panel (4). The evaluation electronics (12) is expediently so configured that it emits a control signal to the electronic control unit (2) when the velocity of the variation of the overall capacitance exceeds a defined limit value during a certain evaluation period of approx. 50 to 100 ms. Such a variation in the capacitance recorded at the sensor surface (9) constitutes a reliable criterion for a well-aimed touching of the operating panel (4) performed in the range of the corresponding operating field (5) with a finger (6). Furthermore, a sound producing switching circuit (15) is allocated to the operating unit (3) to emit operating noise and sound through a loudspeaker (16) if by means of the evaluation electronics (12) a touching of the operating field (5) is registered. The operating noise is imitated to the noise that occurs on actuating an electro-mechanical key like those usually implemented in conventional gambling machines for operation.

The invention claimed is:

1. A gambling machine comprising:

a display unit to display a course of a game and to display the results of a game;

an operating unit to influence the course of a game; and an electronic control unit connected to said display unit and to said operating unit to control the course of a game and to determine the game results, wherein said operating unit comprises a several millimeter thick operating panel made of a dielectric material a front side of said operating panel forming an operating surface of the operating unit, wherein said operating panel is subdivided into a plurality of operating fields, wherein a plurality of capacitive sensor elements is arranged on a rear side of said operating panel, wherein each capacitive sensor element of said plurality of capacitive sensor elements is allocated to a respective operating field of said plurality of operating fields, wherein said operating panel is made of a hard and form-stable plastic material having dielectric properties and configured to provide substantially no movement of said operating panel during operation of the gambling machine, and wherein a respective sensor surface of each of said plurality of capacitive sensor elements is coupled to said electronic control unit by a digital evaluation electronic interface, said digital evaluation electronic interface being configured to evaluate for each capacitive sensor element a velocity of variation in time of a capacitance recorded at said respective sensor surface, the capacitance determined by a network comprising a first capacitance between said respective sensor surface and a portion of an operator's body, a second capacitance between said respective sensor surface and a remainder of the gambling machine and a third capacitance of the operator's body, and said digital evaluation electronic interface being configured to generate a control signal depending on a result of the evaluation and to transmit the control signal to said electronic control unit when the velocity of variation in time of the capacitance exceeds a defined limit value on a condition that the velocity of variation in time of the capacitance does not again fall under the defined limit value during a defined time interval.

2. A gambling machine as defined in claim 1, wherein the operating panel is at least partly transparent, with a marking foil being arranged between the operating panel and the sensor surfaces of the sensor elements, said marking foil being imprinted in conformity with the subdivision of said operating panel into operating fields.

3. A gambling machine as defined in claim 1, wherein said digital evaluation electronic interface is arranged spatially away from said operating panel.

4. A gambling machine as defined in claim 1, further comprising a sound producing switching circuit allocated to said operating unit and configured for electronically generating operating sounds.

* * * * *